United States Patent
Wang et al.

(10) Patent No.: US 11,316,930 B2
(45) Date of Patent: *Apr. 26, 2022

(54) CONNECTION CONTROL METHOD AND DEVICE

(71) Applicant: Shanghai Bilibili Technology Co., Ltd., Shanghai (CN)

(72) Inventors: Sheng Wang, Shanghai (CN); Quan Zhou, Shanghai (CN); Shangzhi Cai, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 141 days.

This patent is subject to a terminal disclaimer.

(21) Appl. No.: 16/634,872

(22) PCT Filed: Oct. 17, 2019

(86) PCT No.: PCT/CN2019/111683
§ 371 (c)(1),
(2) Date: Jan. 28, 2020

(87) PCT Pub. No.: WO2020/211313
PCT Pub. Date: Oct. 22, 2020

(65) Prior Publication Data
US 2021/0258386 A1 Aug. 19, 2021

(30) Foreign Application Priority Data
Apr. 19, 2019 (CN) .......................... 201910318602.4

(51) Int. Cl.
*H04L 29/08* (2006.01)
*H04L 29/06* (2006.01)
(Continued)

(52) U.S. Cl.
CPC .......... *H04L 67/141* (2013.01); *H04L 69/164* (2013.01)

(58) Field of Classification Search
CPC .......................... H04L 67/141; H04L 69/164
See application file for complete search history.

(56) References Cited

U.S. PATENT DOCUMENTS 9,253,691 B2   2/2016   Zhang et al.
9,350,678 B2   5/2016   Mann et al.
(Continued)

FOREIGN PATENT DOCUMENTS

CN   107786307 A   3/2018
CN   108234433 A   6/2018
(Continued)

OTHER PUBLICATIONS

International Patent Application No. PCT/CN2019/111683; Int'l Search Report and the Written Opinion; dated Dec. 30, 2019; 8 pages.

*Primary Examiner* — Nam T Tran
(74) *Attorney, Agent, or Firm* — BakerHostetler (57) ABSTRACT

Embodiments of the present application provide a computer-implemented connection control method based on a QUIC protocol, comprising: receiving a QUIC connection request from a peer endpoint; analyzing the QUIC connection request and obtaining identification information of the peer endpoint; retrieving target historical information of the peer endpoint based on the identification information; adjusting a transport parameter based on the target historical information; establishing a QUIC connection with the peer endpoint based on an adjusted transport parameter; and controlling a connection state of the QUIC connection based on the adjusted transport parameter.

14 Claims, 8 Drawing Sheets

(51) Int. Cl.
*H04L 67/141* (2022.01)
*H04L 69/164* (2022.01)

(56) References Cited

U.S. PATENT DOCUMENTS

| | | | |
|---|---|---|---|
| 9,596,281 B2 | 3/2017 | Luby et al. | |
| 10,592,322 B1* | 3/2020 | Seshadri | G06F 11/3006 |
| 10,958,702 B1* | 3/2021 | Yang | H04L 65/4084 |
| 2008/0104259 A1* | 5/2008 | LeFevre | H04L 67/1097 |
| | | | 709/228 |
| 2008/0205288 A1* | 8/2008 | Herzog | H04L 61/2578 |
| | | | 370/252 |
| 2011/0055376 A1* | 3/2011 | Little | G06F 9/466 |
| | | | 709/224 |
| 2012/0185585 A1* | 7/2012 | Bhate | H04L 63/1458 |
| | | | 709/224 |
| 2014/0128058 A1 | 5/2014 | Ji et al. | |
| 2015/0033343 A1 | 1/2015 | Jiang et al. | |
| 2015/0200845 A1* | 7/2015 | Roskind | H04L 69/22 |
| | | | 370/241 |
| 2015/0271232 A1 | 9/2015 | Luby et al. | |
| 2016/0050684 A1 | 2/2016 | Ni | |
| 2017/0048729 A1 | 2/2017 | Jin et al. | |
| 2017/0055196 A1 | 2/2017 | Fu et al. | |
| 2017/0290054 A1 | 10/2017 | Zhao | |
| 2018/0121516 A1 | 5/2018 | Ohtsuji | |
| 2019/0201594 A1 | 7/2019 | Shelton, IV et al. | |
| 2020/0205096 A1 | 6/2020 | Koffman | |

FOREIGN PATENT DOCUMENTS

| | | |
|---|---|---|
| CN | 108667646 A | 10/2018 |
| CN | 108769102 A | 11/2018 |
| CN | 109155744 A | 1/2019 |
| WO | WO 2016/060967 A1 | 4/2016 |
| WO | WO 2017/080611 A1 | 5/2017 |

* cited by examiner

CONNECTION CONTROL METHOD AND DEVICE

CROSS-REFERENCE TO RELATED APPLICATION

The present application is the U.S. National Stage of International Application No. PCT/CN2019/111683, filed on Oct. 17, 2019, which claims priority of Chinese patent application No. 201910318602.4, filed on Apr. 19, 2019. The entire disclosure of the above-identified application is hereby incorporated by reference herein and made a part of this specification.

TECHNICAL FIELD

The embodiments of the present application relate to a technical field of network communication, and more particularly to connection control techniques.

BACKGROUND

The hypertext transfer protocol (HTTP) transport protocol built on the transmission control protocol (TCP) is a network transport protocol most widely used in the Internet, used for transmitting hypertext markup language (HTML) documents from a server to a computer device. However, with the increase of images, video, and other multimedia contents, the increased multimedia content means that HTML pages become more complex, making page load time longer than ever.

SUMMARY

The object of the embodiments of the present application is to provide a connection control method, system, computing device, and computer-readable storage medium, which aims to avoid resource waste and data offset, on the condition that a transport parameter is large/disabled or that a connection is terminated abnormally.

One aspect of the embodiments of the present application provides a computer-implemented connection control method based on a QUIC protocol, comprising: receiving a QUIC connection request from a peer endpoint; analyzing the QUIC connection request to obtain identification information of the peer endpoint; retrieving target historical information of the peer endpoint based on the identification information; adjusting a transport parameter based on the target historical information, when the target historical information is retrieved; establishing a QUIC connection with the peer endpoint based on an adjusted transport parameter; and controlling a connection state of the QUIC connection based on the adjusted transport parameter.

Preferably, the retrieving the target historical information of the peer endpoint based on the identification information comprises: retrieving the target historical information from a historical data set based on the identification information; wherein, the target historical information comprises a number of connection terminations of QUIC connections, the QUIC connections are connections being not actively closed by the peer endpoint.

Preferably, further comprising: adjusting the transport parameter based on a predetermined threshold value, when the target historical information is not retrieved.

Preferably, the transport parameter comprises an idle timeout indicative of a maximum time for allowing a QUIC connection being in an idle state; the adjusting the transport parameter based on the predetermined threshold value comprises: adjusting the idle timeout based on the predetermined threshold value.

A QUIC connection will be terminated when the allowable maximum time is reached. However, when the idle timeout is large/disabled or the QUIC connection is abnormally terminated (e.g., no CONNECTION_CLOSE frame), several problems may arise as follows: (1) the QUIC connection will not be terminated unless the idle time of QUIC connection is longer than the idle timeout, and even never be terminated if the idle timeout is disabled, thereby resulting in data retransmission and resource (e.g., bandwidth) waste; (2) when a client endpoint continues to reuse the QUIC connection, a service endpoint does not re-establish the QUIC connection, thereby leading to data offset. The techniques described in this disclosure resolve these problems as noted above. Preferably, the adjusting the idle timeout based on the predetermined threshold value comprises: adjusting the idle timeout to the predetermined threshold value when the idle timeout is absent or is equal to zero; adjusting the idle timeout to the predetermined threshold value when the idle timeout is greater than the predetermined threshold value.

Preferably, wherein the predetermined threshold value is a system-level parameter value.

Preferably, further comprising adjusting the predetermined threshold value.

Preferably, the adjusting the predetermined threshold value further comprises: adjusting the predetermined threshold value based on system information; wherein, the system information comprises utilization information of a CPU, utilization information of a memory, and/or utilization information of a disk interface.

Preferably, the adjusting the predetermined threshold value further comprises: adjusting the predetermined threshold value based on network flow information.

Preferably, the adjusting the predetermined threshold value further comprises: adjusting the predetermined threshold value based on a data type of to-be-transmitted data; wherein, the data type comprises a long-video type and a short-video type which are distinguished according to a predetermined playtime length.

Preferably, the adjusting the predetermined threshold value further comprises: adjusting the predetermined threshold value based on a plurality of video parameters of to-be-transmitted data; wherein, the plurality of video parameters comprise a resolution, a frame rate, a code rate, and a buffer size of a peer endpoint.

Preferably, a calculation formula of the preset parameter threshold is as follows:

$$D/C*(A|B)*factor$$

A represents the resolution, B represents the frame rate, C represents the code rate, D represents the buffer size of the peer endpoint, factor represents a tolerance value, (A|B) represents a relative value calculated based on the resolution and the frame rate and based on a standard resolution and a standard frame rate.

Preferably, a range of the tolerance value is from 1.5 to 2.

Preferably, the adjusted transport parameter is obtained via a calculation formula $Y/2^n$, wherein, Y represents the transport parameter in the QUIC connection request, n represents the number of the connection terminations.

Preferably, the controlling the connection state of the QUIC connection based on the adjusted transport parameter comprises: monitoring an idle time of the QUIC connection being in an idle state; comparing whether the idle time exceeds the adjusted transport parameter; and switching the connection state of the QUIC connection to a draining connection state, when the idle time exceeds the adjusted transport parameter.

Preferably, the monitoring the idle time of the QUIC connection being in the idle state comprises: recording the idle time of the QUIC connection being in the idle state by a timer; and resetting the timer and restarting a timing operation when received data has been processed successfully at an HTTP layer or to-be-transmitted data has been transmitted successfully at a UDP socket.

Preferably, further comprising: monitoring a termination event of the QUIC connection and updating the historical data set based on the termination event.

Preferably, the monitoring the termination event of the QUIC connection and updating the historical data set based on the termination event comprises: monitoring the termination event of the QUIC connection; determining an trigger event type of the termination event, the trigger event type comprising an active trigger event type in relative to the peer endpoint and a passive trigger event type in relative to the peer endpoint; recording the termination event of the QUIC connection into the historical data set, when the trigger event type of the termination event is the passive trigger event type; and clearing the target historical information from the historical data set, when the trigger event type of the termination event is the active trigger event type.

Yet another aspect of the embodiments of the present application provides connection control system based on a QUIC protocol, comprising: an obtaining module, receiving a QUIC connection request from a peer endpoint; an analyzing module, analyzing the QUIC connection request to obtain identification information of the peer endpoint; a retrieving module, retrieving target historical information of the peer endpoint based on the identification information; an adjusting module, adjusting a transport parameter based on the target historical information, when the target historical information is retrieved; a establishing module, establishing a QUIC connection with the peer endpoint based on an adjusted transport parameter; and a controlling module, controlling a connection state of the QUIC connection based on the adjusted transport parameter.

Yet another aspect of the embodiments of the present application provides a computing device, which comprises a memory, a processor, and one or more computer programs that stored in the memory and operable on the processor, wherein the processor executes the one or more computer programs for implementing a connection control method based on a QUIC protocol as described above.

Yet another aspect of the embodiments of the present application provides a computer-readable storage medium, which stores one or more computer programs, the one or more programs can be executed by at least one processor, cause the at least one processor to implement a connection control method based on a QUIC protocol as described above.

The connection control method based on a QUIC protocol, system, computing device, and computer-readable storage medium provided by the embodiments of the present application is configured to adjust a transport parameter advertised in a process of establishing a target connection based on target historical information, and to control a connection state of the target connection, thereby effectively controlling the connection state of the target connection and avoiding problems of resource waste and data offset that may be caused because of controlling the target connection using an advertised transport parameter.

DETAILED DESCRIPTION OF ILLUSTRATIVE EMBODIMENTS

To make the objectives, technical solutions and advantages of the present application more comprehensible, the present application is described in further detail below with reference to embodiments and the accompanying drawings. It should be understood that the specific embodiments described herein are merely used for explaining the present application, and are not intended to limit the present application. All other embodiments obtained by those skilled in the art based on the embodiments of the present application without creative efforts shall fall within the protection scope of the present application.

It should be noted that the description of "first", "second" and the like in the present application is used for the purpose of description only, and cannot be construed as indicating or implying its relative importance or implicitly indicating the number of the indicated technical features. Thus, features defining "first" or "second" may include at least one of the features, either explicitly or implicitly. In addition, the technical solutions in the embodiments can be combined with each other, but must be based on the realization of those ordinary skilled in the art, when the combinations of the technical solutions are contradictory or unrealizable, it shall be deemed that the combinations of the technical solutions do not exist and are not within the protection scope required by the present application.

Figure 1:
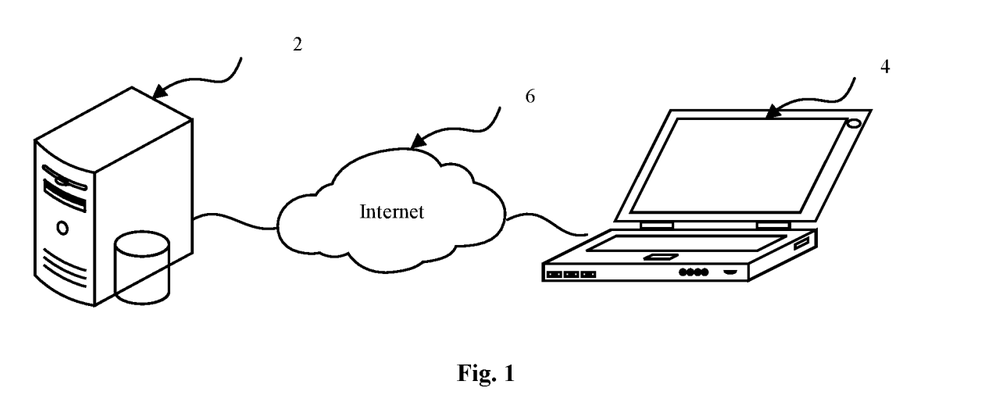
FIG. 1 is a schematic diagram of a connection control method according to embodiments of the present application.

FIG. 1 is a schematic diagram of a connection control method according to embodiments of the present application. In an exemplary embodiment, a computing device 2 is able to transmit data to a peer endpoint 4 through a network 6. The computing device 2 may be an electronic device such as a server, a mobile phone, a tablet personal computer, a laptop computer, or the like. The peer endpoint 4 may be an electronic device such as a server, a set-top box, a mobile phone, a tablet personal computer, a laptop computer, a smart TV, or the like. The network 6 may be the Internet.

Embodiment 1

Figure 2:
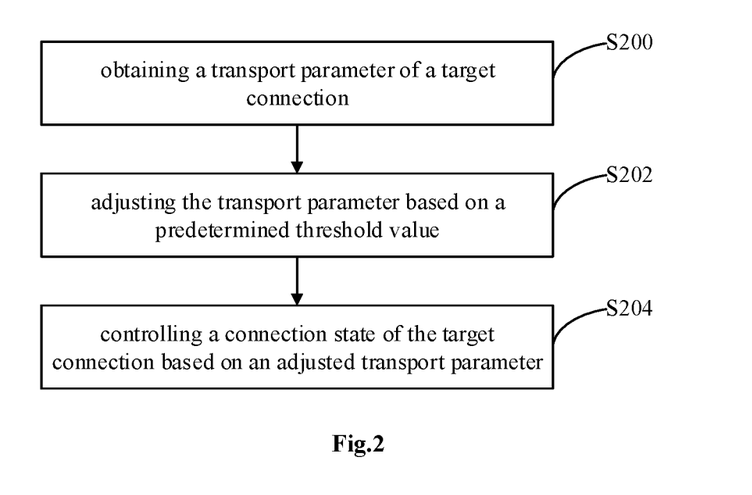
FIG. 2 illustrates a flowchart of a connection control method according to a first embodiment of the present application.

FIG. 2 illustrates a flowchart of a connection control method according to a first embodiment of the present application. It should be understood that the flowchart of the embodiment is not intended to limit the order of the steps. The method is exemplarily described below using a computing device 2 as an executive body.

As shown in FIG. 2, the connection control method may include steps S200~S204, wherein:

Step S200, obtaining a transport parameter of a target connection;

In one exemplary embodiment, the target connection may a communication connection between the computing device 2 and a peer endpoint 4, such as a QUIC connection or a TCP connection. Various types of data, such as videos, audio, and/or images, may be transmitted between the computing device 2 and the peer endpoint 4 based on the target connection.

In one exemplary embodiment, the transport parameter may include an idle timeout. The idle timeout may be a value in seconds that is encoded as an integer, which is configured to indicate a time length of allowing the target connection being in an idle state.

In one exemplary embodiment, the step of obtaining the transport parameter includes: resolving to obtain the transport parameter in handshake data through cryptohandshake (see TLS1.3) in a process of establishing the target connection. Wherein, the idle timeout is a field value of one of the fields (idle timeout field) of the transport parameter.

Step S202, adjusting the transport parameter based on a predetermined threshold value.

In one exemplary embodiment, the predetermined threshold value is a system-level parameter value, and a default value of the predetermined threshold value may be 120000 milliseconds. The predetermined threshold value may be manually set, or may be automatically set via a script program. An exemplary script program is provided as follows: (1) detecting a type of an operating system of the computer device 2, wherein the type may be iOS, Mac OS, Windows, Android, Linux, or the like; (2) modifying system environment variables, registry or file adjustment information according to a predetermined file path, based on the type of the operating system of the computer device 2. For example, parameters may be modified by entering into "/MACHINE/Software/ . . . " of the registry, when the Windows Operating System is running in the computer device 2.

Figure 3:
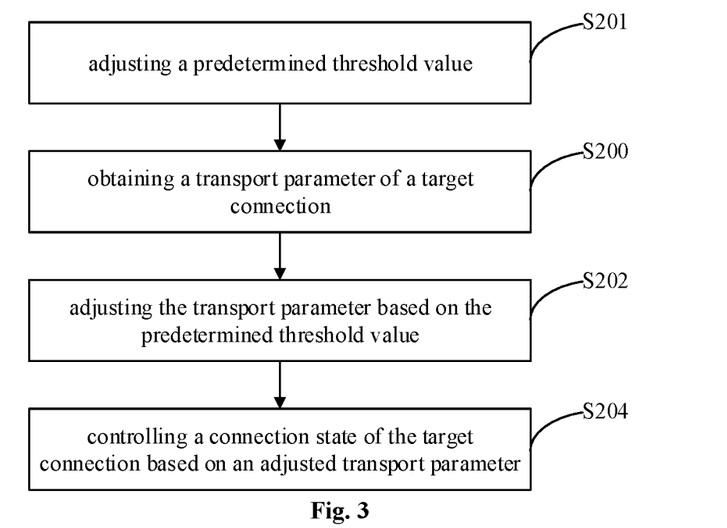
FIG. 3 illustrates another flowchart of a connection control method according to the first embodiment of the present application.

In one exemplary embodiment, as shown in FIG. 3, the connection control method further includes step S201 of adjusting the predetermined threshold value. Exemplary, the predetermined threshold value may be adjusted via several strategies as follows:

Strategy one, the predetermined threshold value is adjusted based on system information;

wherein, the system information comprises utilization information of a CPU, utilization information of a memory, and/or utilization information of a disk interface.

Strategy two, the predetermined threshold value is adjusted based on network flow information.

Strategy three, the predetermined threshold value is adjusted based on a data type of to-be-transmitted data.

wherein, the data type includes a long-video type and a short-video type which are distinguished according to a predetermined playtime length.

Strategy four, the predetermined threshold value is adjusted based on a plurality of video parameters of to-be-transmitted data.

wherein, the plurality of video parameters comprise a buffer size of a peer endpoint, a resolution, a frame rate, and a code rate.

For example, the predetermined threshold value is calculated via a formula as follows:

$$D/C*(A|B)*factor$$

Wherein, A represents the resolution, B represents the frame rate, C represents the code rate, D represents the buffer size of the peer endpoint, factor represents a tolerance value, (A|B) represents a relative value calculated based on the resolution and the frame rate and based on a standard resolution and a standard frame rate. Exemplary, when the standard resolution is 360, the standard frame rate is 30, the resolution A of the to-be-transmitted data is 1080, and the frame rate B of the to-be-transmitted data is 30, the relative value is calculated as follows:

$$\sqrt{\frac{1080}{360}} * \frac{30}{30} = 1.73.$$

Exemplary, a range of the tolerance value is from 1.5 to 2.

In one exemplary embodiment, as shown in FIG. 3, the step S202 may include a step of adjusting an idle timeout based on the predetermined threshold value.

In one exemplary embodiment, the adjusting the idle timeout includes steps of: adjusting the idle timeout to the predetermined threshold value when the idle timeout is absent or is set to zero; adjusting the idle timeout to the predetermined threshold value when the idle timeout is greater than the predetermined threshold value; maintaining the idle timeout when the idle timeout is not greater than the predetermined threshold value and is greater than zero.

Step S204, controlling a connection state of the target connection based on an adjusted transport parameter.

Figure 4:
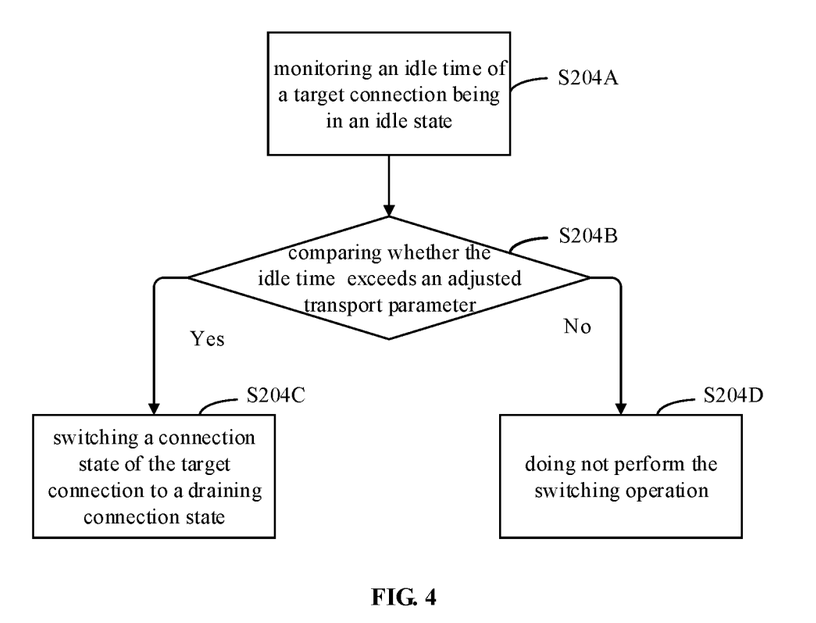
FIG. 4 illustrates a flowchart of step S204 of FIG. 1.

In one exemplary embodiment, as shown in FIG. 4, the step S204 includes: step S204A of monitoring an idle time of the target connection being in an idle state; step S204B of comparing whether the idle time exceeds the adjusted transport parameter; if yes, the method goes to step S204C, if no, the method goes to step S204D; step S204C of switching the connection state of the target connection to a draining connection state; and step S204C of doing not perform the switching operation.

Figure 5:
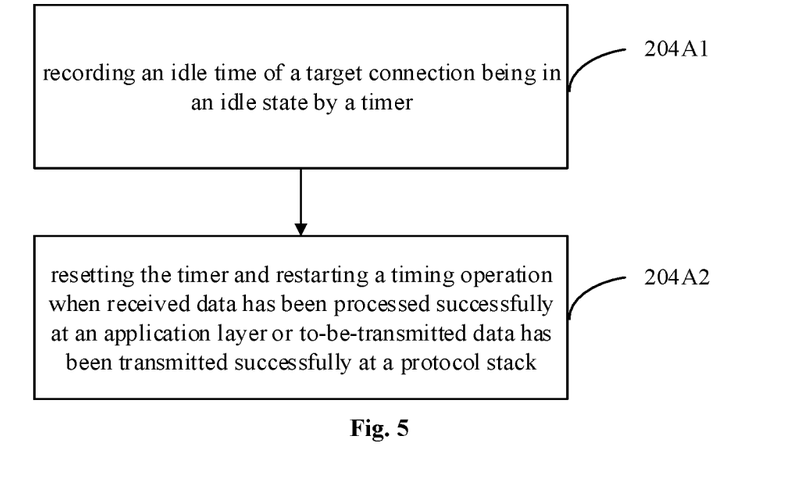
FIG. 5 illustrates a flowchart of step S204A of FIG. 4.

In one exemplary embodiment, as shown in FIG. 5, the step S204A further includes: step S204A1 of recording the idle time of the target connection being in the idle state by a timer, and step S204A2 of resetting the timer and restarting a timing operation when received data has been processed successfully at an application layer or to-be-transmitted data has been transmitted successfully at a protocol stack.

When the target connection is a QUIC connection with a QUIC protocol, the step S204A2 may further include step of resetting the timer and restarting the timing operation when the received data has been processed successfully at an HTTP layer or the to-be-transmitted data has been transmitted successfully at a UDP socket; wherein, the to-be-transmitted data does not comprise an ACK message or a PADDING packet.

For Example:

(1) a first resetting time point;

The computing device 2 receives data from the peer endpoint 4, processes common packet header information and decrypts packet payload information through a QUIC protocol stack, and transfers HTTP layer contents of the packet to an HTTP state machine based on a connection ID of the packet. The first resetting time point is a time point when the HTTP state machine has successfully processed the HTTP layer contents.

(2) a second resetting time point;

The computing device 2 transmits data to the peer endpoint 4, packages the data (HTTP header and HTTP body) through an HTTP layer, submits the packaged data to the QUIC protocol stack, packages the packaged data (e.g, adds QUIC header information) to obtain a QUIC packet, and transmits the QUIC packet through a UDP socket. The second resetting time point is a time point when the UDP socket has successfully transmitted the QUIC packet.

It is noted that the timer is reset upon the condition that the first resetting time point or the second resetting time point is detected.

Figure 6:
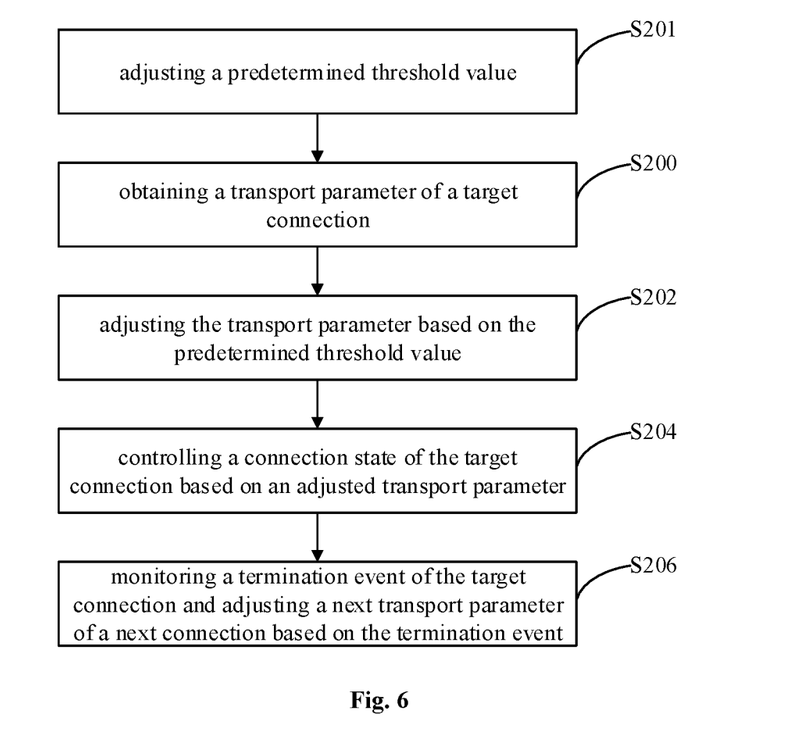
FIG. 6 illustrates another flowchart of a connection control method according to the first embodiment of the present application.

In one exemplary embodiment, as shown in FIG. 6, the method further includes step S206 of monitoring a termination event of the target connection and adjusting a next transport parameter of a next connection based on the termination event.

Exemplary, a termination event is determined when the target connection enters into the draining connection state or a closing connection state.

Figure 7:
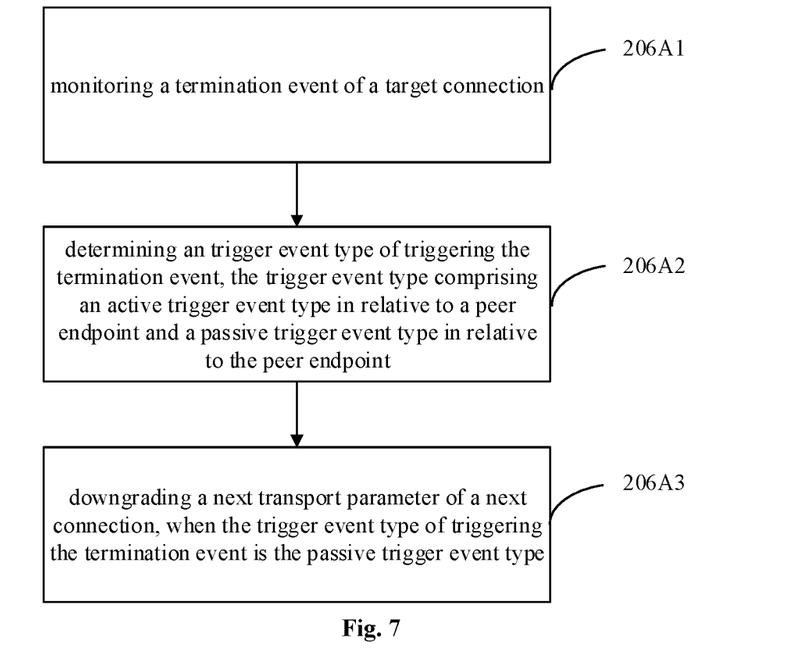
FIG. 7 illustrates a flowchart of step S206 of FIG. 6.

In one exemplary embodiment, as shown in FIG. 7, the step S206 may further include: step S206A1 of monitoring the termination event of the target connection; step S206A2 of determining an trigger event type of triggering the termination event, the trigger event type comprising an active trigger event type in relative to the peer endpoint and a passive trigger event type in relative to the peer endpoint; and step S206A3 of downgrading the next transport parameter of the next connection, when the trigger event type of triggering the termination event is the passive trigger event type.

The active trigger event type in relative to the peer endpoint indicates that the peer endpoint actively sends a CONNECTION_CLOSE frame to the computing device 2, to notify the computing device that the target connection is being closed.

The passive trigger event type in relative to the peer endpoint indicates that the target connection is terminated by the computing device 2. For example, the computing device 2 switches the connection state of the target connection to the draining connection state, when the idle time of the target connection being in the idle state is longer than the predetermined threshold value.

Figure 8:
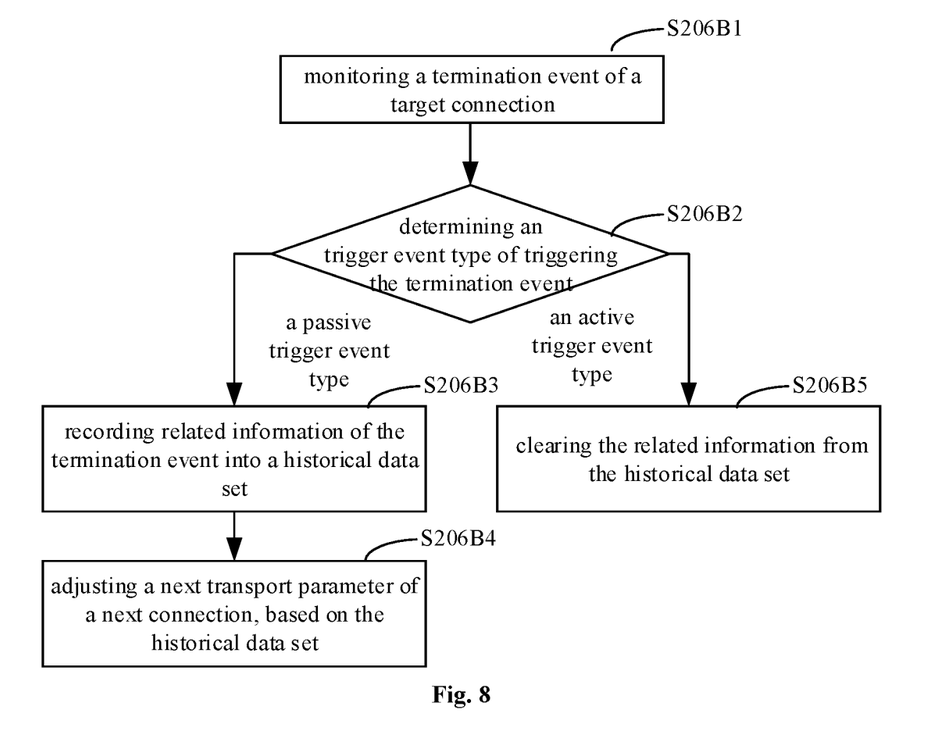
FIG. 8 illustrates another flowchart of step S206 of FIG. 6.

In one exemplary embodiment, as shown in FIG. 8, the step S206 may further include: step S206B1 of monitoring the termination event of the target connection; step S206B2 of determining an trigger event type of triggering the termination event, the trigger event type comprising an active trigger event type in relative to the peer endpoint and a passive trigger event type; step S206B3 of recording related information of the termination event into a historical data set when the trigger event type of triggering the termination event is the passive trigger event type, the related information comprising identification information (e.g., IP address) of the peer endpoint and a number of termination events of the passive trigger event type of the peer endpoint; and step S206B4 of adjusting the next transport parameter of the next connection, based on the historical data set.

In one exemplary embodiment, as shown in FIG. 8, the step S206 may further include: step S206B5 of clearing the related information from the historical data set, when the trigger event type of triggering the termination event is the active trigger event type.

The connection control method of embodiment 1 of the present application is configured to adjust the transport parameter advertised in a process of establishing the target connection based on the predetermined parameter threshold value, and to control the connection state of the target connection, thereby effectively controlling the connection state of the target connection and avoiding problems as follows: (1) in a case 1 or a case 2, the computing device 2 may constantly retransmit data to result in resource (e.g., bandwidth, RAM) waste; wherein, the case 1: the target connection is terminated if only the target connection remains idle of a long time period on the condition that the transport parameter is large, the case 2: the target connection may never be terminated if the transport parameter is disabled (e.g., the transport parameter is zero or there is not a field corresponding to the transport parameter); (2) when the peer endpoint continues to reuse the target connection, but the computing device does not re-establish the target connection, thereby resulting in data offset.

Embodiment 2

Figure 9:
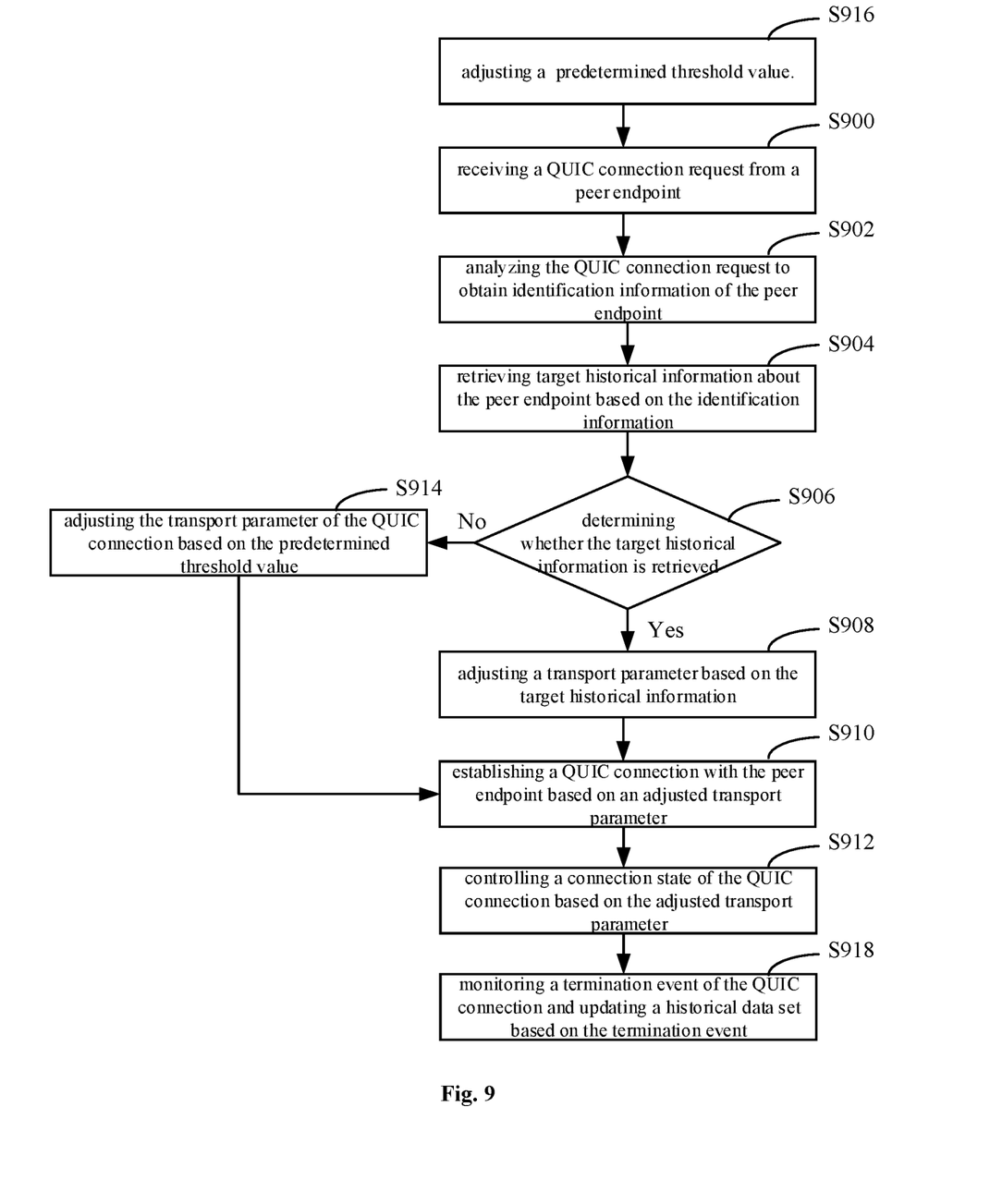
FIG. 9 illustrates a flowchart of a connection control method based on a QUIC protocol according to a second embodiment of the present application.

FIG. 9 is a flowchart of a connection control method according to a second embodiment of the present application. The connection control method may include steps S900 to S918, wherein:

Step S900, receiving a QUIC connection request from a peer endpoint.

Step S902, analyzing the QUIC connection request to obtain identification information of the peer endpoint.

The identification information may be IP address, IMSI (International Mobile Subscriber Identification Number), IMEI (International Mobile Equipment Identity), telephone number, and/or the like.

Step S904, retrieving target historical information of the peer endpoint based on the identification information.

Exemplary, the target historical information may be retrieved from a historical data set based on the identification information; wherein, the target historical information comprises a number of connection terminations of QUIC connections, the QUIC connections are connections being not actively closed by the peer endpoint.

The historical data set is configured to record a number of connection terminations for each mobile device. Exemplarily, the computing device 2 and the peer endpoint 4 have terminated a plurality of QUIC connections in sequence, such as a QUIC connection #1, a QUIC connection #2, . . . , a QUIC connection N. If the QUIC connection #1 is terminated by the computing device 2 because an idle time of the QUIC connection #1 exceeds a predetermined threshold value, a termination event #1 corresponding to the QUIC connection #1 is recorded into the historical data set. If the QUIC connection #2 is terminated by the computing device 2 because an idle time of the QUIC connection #2 exceeds a predetermined threshold value, a termination event #2 corresponding to the QUIC connection #2 is recorded into the historical data set; and the rest of QUIC connections may be deduced like previous examples to obtain the number of the connection terminations of the peer endpoint. It should be noted, if a QUIC connection #M (1≤M≤N) is actively terminated by the peer endpoint. The target historical information of the peer endpoint 4 needs to be cleared from the historical data set, or the number of the connection terminations corresponding to the peer endpoint needs to be set to zero.

Step S906, determining whether the target historical information is retrieved.

Step S908, adjusting a transport parameter based on the target historical information, when the target historical information is retrieved.

The adjusted transport parameter is obtained via a calculation formula $Y/2^n$, wherein, Y represents a transport parameter in the QUIC connection request, n represents the number of connection terminations. The transport parameter of the QUIC connection request may include an idle timeout, the idle timeout may be a value in seconds that is encoded as an integer.

Step S910, establishing a QUIC connection with the peer endpoint based on an adjusted transport parameter.

The adjusted transport parameter may be configured to constrain a maximum idle time that the QUIC connection remains an idle state.

Step S912, controlling a connection state of the QUIC connection based on the adjusted transport parameter.

Figure 10:
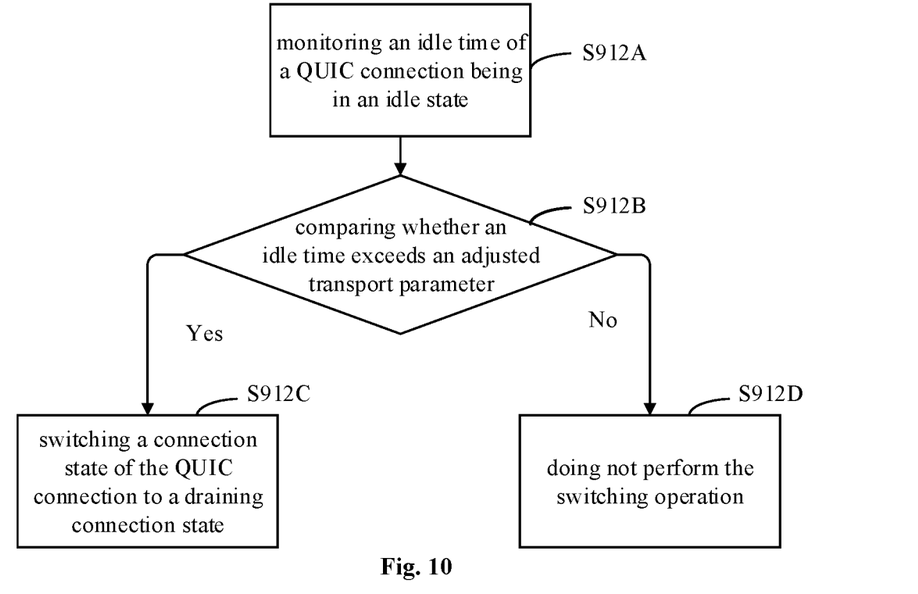
FIG. 10 illustrates a flowchart of step S912 of FIG. 9.

In one exemplary embodiment, as shown in FIG. 10, the step S912 may further include: step S912A of monitoring an idle time of the QUIC connection being in an idle state; step S912B of comparing whether the idle time exceeds the adjusted transport parameter; step S912C of switching the connection state of the QUIC connection to a draining connection state, when the idle time exceeds the adjusted transport parameter; step S912D of doing not perform the switching operation when the idle time does not exceed the adjusted transport parameter.

In one exemplary embodiment, the step S912A may further include steps of recording the idle time of the QUIC connection being in the idle state by a timer; and resetting the timer and restarting a timing operation when received data has been processed successfully at an HTTP layer or to-be-transmitted data has been transmitted successfully at a UDP socket; wherein, the to-be-transmitted data does not comprise an ACK message or a PADDING packet.

In one exemplary embodiment, the connection control method further includes step S914 of adjusting the transport parameter of the QUIC connection based on a predetermined threshold value, when the target historical information is not retrieved successfully.

In one exemplary embodiment, the transport parameter may include an idle timeout, the step S914 further includes a step of adjusting the idle timeout based on the predetermined threshold value. Details are shown as follows: the idle timeout is adjusted to the predetermined threshold value when the idle timeout is absent or is equal to zero. The idle timeout is adjusted to the predetermined threshold value when the idle timeout is greater than the predetermined threshold value. The idle timeout is not adjusted when the idle timeout is not greater than the predetermined threshold value and is greater than zero.

In one exemplary embodiment, the predetermined threshold value is a system-level parameter value.

In one exemplary embodiment, the connection control method further includes a step S916 of adjusting the predetermined threshold value. Exemplary, the predetermined threshold value may be adjusted via several strategies as follows:

Strategy one, the predetermined threshold value is adjusted based on system information;

wherein, the system information comprises utilization information of a CPU, utilization information of a memory, and/or utilization information of a disk interface.

Strategy two, the predetermined threshold value is adjusted based on network flow information.

Strategy three, the predetermined threshold value is adjusted based on a data type of to-be-transmitted data.

wherein, the data type includes a long-video type and a short-video type which are distinguished according to a predetermined playtime length.

Strategy four, the predetermined threshold value is adjusted based on a plurality of video parameters of to-be-transmitted data.

wherein, the plurality of video parameters comprise a resolution, a frame rate, a code rate, and a buffer size of a peer endpoint.

For example, the predetermined threshold value is calculated via a formula as follows:

$$D/C*(A|B)*factor$$

Wherein, A represents the resolution, B represents the frame rate, C represents the code rate, D represents the buffer size of the peer endpoint, factor represents a tolerance value, (A|B) represents a relative value calculated based on the resolution and the frame rate and based on a standard resolution and a standard frame rate. Exemplary, when the standard resolution is 360, the standard frame rate is 30, the resolution A of the to-be-transmitted data is 1080, and the frame rate B of the to-be-transmitted data is 30, the relative value is calculated as follows:

$$\sqrt{\frac{1080}{360}} * \frac{30}{30} = 1.73.$$

Exemplary, a range of the tolerance value is from 1.5 to 2.

In one exemplary embodiment, the connection control method further includes a step S918 of monitoring a termination event of the QUIC connection and updating the historical data set based on the termination event.

Figure 11:
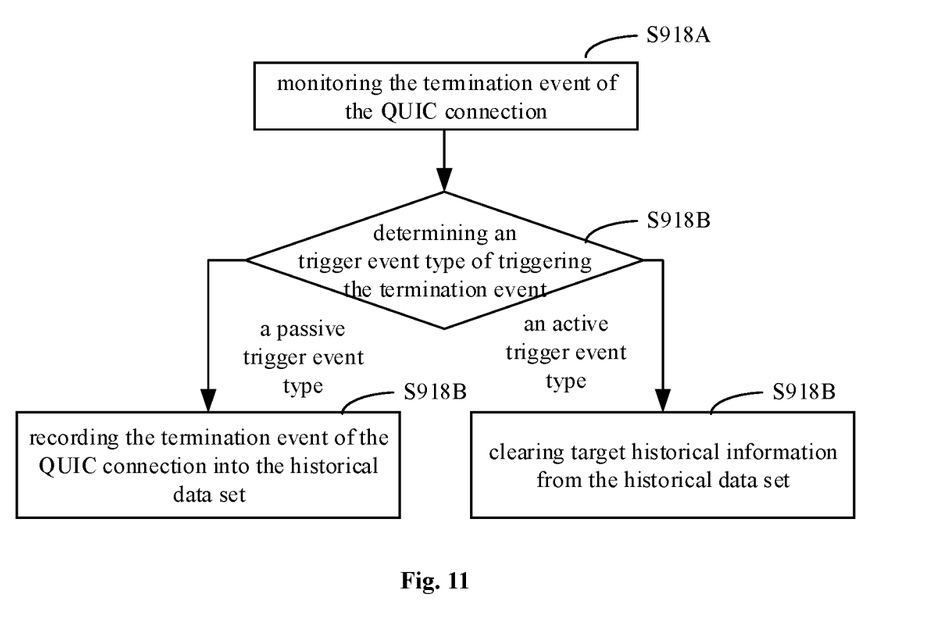
FIG. 11 illustrates another flowchart of step S918 of FIG. 9.

In one exemplary embodiment, as shown in FIG. 11, the step S918 may further include: step S918A of monitoring the termination event of the QUIC connection; step S918B of determining an trigger event type of the termination event, the trigger event type comprising an active trigger event type in relative to the peer endpoint and a passive trigger event type in relative to the peer endpoint; step S918C of recording the termination event of the QUIC connection into the historical data set, when the trigger event type of the termination event is the passive trigger event type; step S918D of clearing the target historical information from the historical data set, when the trigger event type of the termination event is the active trigger event type.

Exemplary, the connection state of the QUIC connection is monitored; the trigger event type of triggering the QUIC connection to enter into a draining connection state or a closing connection is obtained, when it's monitored that the connection state enters into the draining connection state or the closing connection; whether the trigger event type is the passive trigger event type is determined, in other words, the QUIC connection is terminated by the computing device 2 because the idle time exceeds the adjusted transport parameter; related information of the termination event is recorded into the historical data set when the trigger event type is the passive trigger event type, the related information includes identification information of the peer endpoint.

The embodiment 2 of the present application provides the connection control method based on the QUIC protocol in which the predetermined threshold value and the target historical information are introduced:

User behaviors of the peer endpoint are inspected through the target historical information, such as whether the user has the behavior of actively terminating QUIC connections, the transport parameter advertised in the process of establishing the QUIC connection is adjusted based on the user behaviors, and the connection state of the QUIC connection is controlled based on the adjusted transport parameter to save resources.

The connection control method of embodiment 2 of the present application is configured to adjust the transport parameter advertised during establishing the QUIC connection by the predetermined parameter threshold value, and to control the connection state of the QUIC connection based on the adjusted transport parameter, thereby effectively controlling the connection state of the QUIC connection and avoiding problems as follows: (1) in a case 1 or a case 2, the computing device 2 may constantly retransmit data to result in resource (e.g., bandwidth, RAM) waste; wherein, the case 1: the QUIC connection is terminated if only the QUIC connection remains idle of a long time period, on the condition that the transport parameter is large, the case 2: the QUIC connection may never be terminated if the transport parameter is disabled (e.g., the transport parameter is zero or there is not a field corresponding to the transport parameter); (2) when the peer endpoint continues to reuse the QUIC connection, but the computing device does not re-establish the QUIC connection, thereby resulting in data offset.

Embodiment 3

Figure 12:
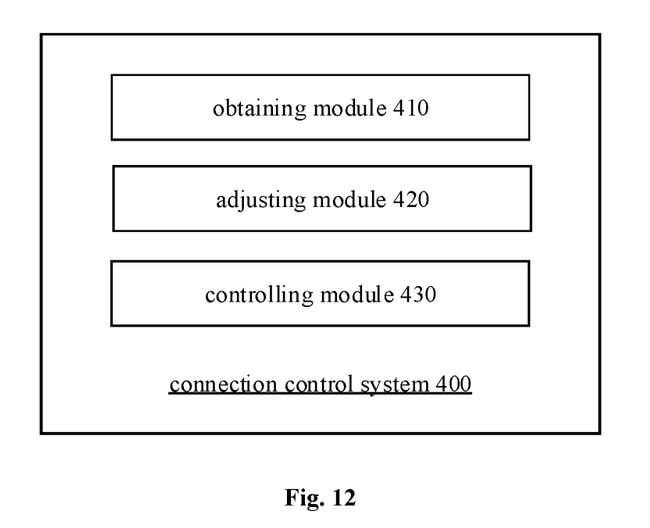
FIG. 12 illustrates a block diagram of a connection control system according to a third embodiment of the present application.

FIG. 12 illustrates a block diagram of a connection control system according to a third embodiment of the present application. The connection control system may be divided into one or more program modules, which are stored in a medium, and executed by one or more processors to implement the embodiment of the present application. The program module referred to in the embodiment of the present application refers to a series of computer program instruction segments capable of accomplishing specific functions, and is more suitable for describing execution process of the connection control system in the medium than the program itself. The following description will specifically describe the functions of the program modules of the embodiment.

As shown in FIG. 12, the connection control system 400 may include an obtaining module 410, an adjusting module 420 and a controlling module 430, wherein:

The obtaining module 410 is configured to obtain a transport parameter of a target connection.

The adjusting module 420 is configured to adjust the transport parameter based on a predetermined threshold value.

The controlling module 430 is configured to control a connection state of the target connection based on an adjusted transport parameter.

In one exemplary embodiment, the transport parameter comprises an idle timeout; the adjusting module 420 is further configured to adjust the idle timeout based on the predetermined threshold value.

In one exemplary embodiment, the adjusting module 420 is further configured to adjust the idle timeout to the predetermined threshold value when the idle timeout is absent or is set to zero.

In one exemplary embodiment, the adjusting module 420 is further configured to adjust the idle timeout to the predetermined threshold value when the idle timeout is greater than the predetermined threshold value.

In one exemplary embodiment, the adjusting module 420 is further configured to maintain the idle timeout when the idle timeout is not greater than the predetermined threshold value and is greater than zero.

In one exemplary embodiment, the predetermined threshold value is a system-level parameter value.

In one exemplary embodiment, the connection control system 400 further includes a threshold value adjusting module, which is configured to adjust the predetermined threshold value.

In one exemplary embodiment, the threshold value adjusting module is further configured to adjust the predetermined threshold value based on system information; wherein, the system information comprises utilization information of a CPU, utilization information of a memory, and/or utilization information of a disk interface.

In one exemplary embodiment, the threshold value adjusting module is further configured to adjust the predetermined threshold value based on network flow information.

In one exemplary embodiment, the threshold value adjusting module is further configured to adjust the predetermined threshold value based on a data type of to-be-transmitted data; wherein, the data type comprises a long-video type and a short-video type which are distinguished according to a predetermined playtime length.

In one exemplary embodiment, the threshold value adjusting module is further configured to adjust the predetermined threshold value based on a plurality of video parameters of to-be-transmitted data; wherein, the plurality of video parameters comprise a resolution, a frame rate, a code rate, and a buffer size of a peer endpoint.

In one exemplary embodiment, a calculation formula of the preset parameter threshold is as follows:

$$D/C*(A|B)*factor$$

A represents the resolution, B represents the frame rate, C represents the code rate, D represents the buffer size of the peer endpoint, factor represents a tolerance value, (A|B) represents a relative value calculated based on the resolution and the frame rate and based on a standard resolution and a standard frame rate.

In one exemplary embodiment, a range of the tolerance value is from 1.5 to 2.

In one exemplary embodiment, the controlling module 430 is further configured to: monitor an idle time of the target connection being in an idle state; compare whether the idle time exceeds the adjusted transport parameter; and switch the connection state of the target connection to a draining connection state, when the idle time exceeds the adjusted transport parameter.

In one exemplary embodiment, the controlling module 430 is further configured to: record the idle time of the target connection being in the idle stat by a timer; and resetting the timer and restarting a timing operation when received data has been processed successfully at an application layer or to-be-transmitted data has been transmitted successfully at a protocol stack.

In one exemplary embodiment, the connection comprises a QUIC connection with a QUIC protocol; the resetting the timer and restarting the timing operation comprises: resetting the timer and restarting the timing operation when the received data has been processed successfully at an HTTP layer or the to-be-transmitted data has been transmitted successfully at a UDP socket.

In one exemplary embodiment, the connection control system 400 further includes a monitoring module, which is configured to monitor a termination event of the target connection and adjust a next transport parameter of a next connection based on the termination event.

In one exemplary embodiment, the monitoring the termination event of the target connection and adjusting the next transport parameter of the next connection based on the termination event comprises: monitoring the termination event of the target connection; determining a trigger event type of triggering the termination event, the trigger event type comprising an active trigger event type in relative to a peer endpoint and a passive trigger event type in relative to the peer endpoint; and downgrading the next transport parameter of the next connection, when the trigger event type of triggering the termination event is the passive trigger event type.

In one exemplary embodiment, the monitoring the termination event of the target connection and adjusting the next transport parameter of the next connection based on the termination event comprises: monitoring the termination event of the target connection; determining a trigger event type of triggering the termination event, the trigger event type comprising an active trigger event type in relative to a peer endpoint and a passive trigger event type; recording related information of the termination event into a historical data set when the trigger event type of triggering the termination event is the passive trigger event type, the related information comprising identification information of the peer endpoint and a number of termination events of the passive trigger event type of the peer endpoint; and adjusting the next transport parameter of the next connection, based on the historical data set.

In one exemplary embodiment, the monitoring the termination event of the target connection and adjusting the next transport parameter of the next connection based on the termination event comprises: clearing the related information from the historical data set, when the trigger event type of triggering the termination event is the active trigger event type.

Embodiment 4

Figure 13:
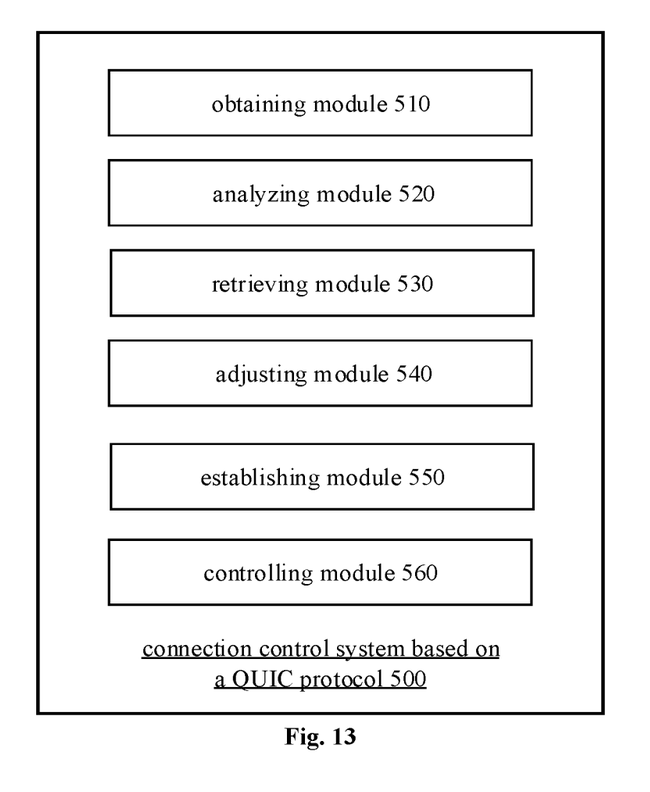
FIG. 13 illustrates a block diagram of a connection control system based on a QUIC protocol according to a fourth embodiment of the present application.

FIG. 13 illustrates a block diagram of a connection control system based on a QUIC protocol according to a fourth embodiment of the present application. The connection control system may be divided into one or more program modules, which are stored in a medium, and executed by one or more processors to implement the embodiment of the present application. The program module referred to in the embodiment of the present application refers to a series of computer program instruction segments capable of accomplishing specific functions, and is more suitable for describing execution process of the connection control system in the medium than the program itself. The following description will specifically describe the functions of the program modules of the embodiment.

As shown in FIG. 13, the connection control system 500 may include an obtaining module 510, an analyzing module 520, a retrieving module 530, an adjusting module 540, a establishing module 550 and a controlling module 560, wherein:

The obtaining module 510 is configured to receive a QUIC connection request from a peer endpoint;

The analyzing module 520 is configured to analyze the QUIC connection request to obtain identification information of the peer endpoint;

The retrieving module 530 is configured to retrieve target historical information of the peer endpoint based on the identification information;

The adjusting module 540 is configured to adjust a transport parameter based on the target historical information, when the target historical information is retrieved;

The establishing module 550 is configured to establish a QUIC connection with the peer endpoint based on an adjusted transport parameter; and The controlling module 560 is configured to control a connection state of the QUIC connection based on the adjusted transport parameter.

In one exemplary embodiment, the retrieving module 530 is further configured to retrieve the target historical information from a historical data set based on the identification information; wherein, the target historical information comprises a number of connection terminations of QUIC connections, the QUIC connections are connections being not actively closed by the peer endpoint.

In one exemplary embodiment, the adjusting module 540 is further configured to adjust the transport parameter based on a predetermined threshold value, when the target historical information is not retrieved.

In one exemplary embodiment, the transport parameter comprises an idle timeout; the adjusting module 540 is further configured to adjust the idle timeout based on the predetermined threshold value.

In one exemplary embodiment, the adjusting module 540 is further configured to: adjust the idle timeout to the predetermined threshold value when the idle timeout is absent or is equal to zero; adjust the idle timeout to the predetermined threshold value when the idle timeout is greater than the predetermined threshold value.

In one exemplary embodiment, wherein the predetermined threshold value is a system-level parameter value.

In one exemplary embodiment, the connection control system 500 further includes a threshold value adjusting module, which is configured to adjust the predetermined threshold value.

In one exemplary embodiment, the threshold value adjusting module is further configured to the predetermined threshold value based on system information; wherein, the system information comprises utilization information of a CPU, utilization information of a memory, and/or utilization information of a disk interface.

In one exemplary embodiment, the threshold value adjusting module is further configured to adjust the predetermined threshold value based on network flow information.

In one exemplary embodiment, the threshold value adjusting module is further configured to adjust the predetermined threshold value based on a data type of to-be-transmitted data; wherein, the data type comprises a long-video type and a short-video type which are distinguished according to a predetermined playtime length.

In one exemplary embodiment, the threshold value adjusting module is further configured to adjust the predetermined threshold value based on a plurality of video parameters of to-be-transmitted data; wherein, the plurality of video parameters comprise a resolution, a frame rate, a code rate, and a buffer size of a peer endpoint.

In one exemplary embodiment, a calculation formula of the preset parameter threshold is as follows:

D/C*(A|B)*factor

A represents the resolution, B represents the frame rate, C represents the code rate, D represents the buffer size of the peer endpoint, factor represents a tolerance value, (A|B) represents a relative value calculated based on the resolution and the frame rate and based on a standard resolution and a standard frame rate.

In one exemplary embodiment, a range of the tolerance value is from 1.5 to 2.

In one exemplary embodiment, the adjusted transport parameter is obtained via a calculation formula $Y/2^n$, wherein, Y represents the transport parameter in the QUIC connection request, n represents the number of connection terminations.

In one exemplary embodiment, the connection control system 500 further includes a monitoring module, which is configured to: monitor an idle time of the QUIC connection being in an idle state; compare whether the idle time exceeds the adjusted transport parameter; and switch the connection state of the QUIC connection to a draining connection state, when the idle time exceeds the adjusted transport parameter.

In one exemplary embodiment, the monitoring the idle time of the QUIC connection being in the idle state comprises: recording the idle time of the QUIC connection being in the idle state by a timer; and resetting the timer and restarting a timing operation when received data has been processed successfully at an HTTP layer or to-be-transmitted data has been transmitted successfully at a UDP socket.

In one exemplary embodiment, the connection control system 500 further includes an updating module, which is configured to: monitor a termination event of the QUIC connection and update the historical data set based on the termination event.

In one exemplary embodiment, the updating module is further configured to: monitor the termination event of the QUIC connection; determine an trigger event type of the termination event, the trigger event type comprising an active trigger event type in relative to the peer endpoint and a passive trigger event type in relative to the peer endpoint; record the termination event of the QUIC connection into the historical data set, when the trigger event type of the termination event is the passive trigger event type; and clear the target historical information from the historical data set, when the trigger event type of the termination event is the active trigger event type.

Embodiment 5

Figure 14:
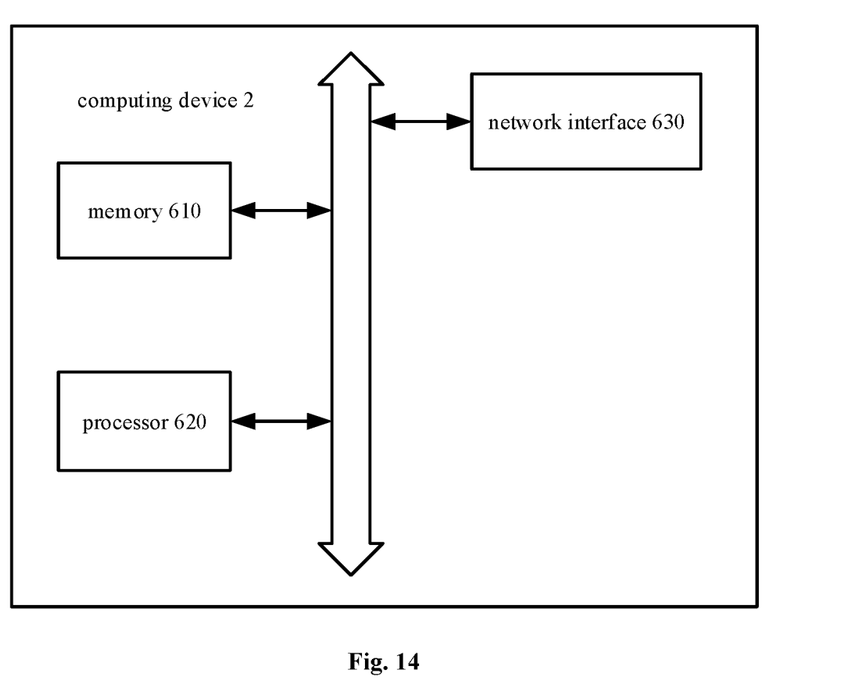
FIG. 14 illustrates a diagram of hardware architecture of a computing device according to a fifth embodiment of the present application.

FIG. 14 illustrates a diagram of hardware architecture of a computing device adopted to implement a connection control method or a connection control method based on a QUIC protocol according to a fifth embodiment of the present application. In the embodiment, the computing device 2 is a device capable of automatically performing numerical calculations and/or information processing according to predefined or stored instructions. For example, computing device 2 can be a Smartphone, tablet, laptop, desktop computer, rack server, blade server, tower server, or cabinet server (including stand-alone servers, or a cluster of multiple servers), and so on. As shown in FIG. 14, the computing device 2 includes, but is not limited to, a memory 610, a processor 620, and a network interface 630 that can be communicated with each other through a system bus. Of which:

The memory 610 includes at least one type of computer-readable storage medium. The readable storage medium includes flash memory, hard disk, multimedia card, card type memory (e.g., SD or DX memory, etc.), random access memory (RAM), static random access memory (SRAM), read-only memory (ROM), electrically erasable programmable read-only memory (EEPROM), programmable read-only memory (PROM), magnetic memory, magnetic disk, optical disk, etc. In some embodiments, the memory 610 may be an internal storage module of the computing device 2 such as a hard disk or memory of the computing device 2. In other embodiments, the memory 610 may also be an external storage device of the computing device 2, such as a plugged hard disk provided on the computing device 2, a smart media card (SMC), secure digital (SD) card, a flash memory card, and the like. Of course, the memory 610 may also include both an internal storage module and an external storage device of the computing device 2. In the embodiment, the memory 610 is generally used to store an operating system and various types of application software installed in the computing device 2 such as program codes of the connection control method and the like. In addition, the memory 610 may also be used to temporarily store various types of data that have been or will be outputted.

The processor 620, in some embodiments, may be a central processing unit (CPU), a controller, a microprocessor, or other data processing chip. The processor 620 is generally used to control the overall operation of the computing device 2 such as performing control and processing related to data interaction or communication with the computing device 2. In the embodiment, the processor 620 is used to run program code stored in the memory 610 or process data.

The network interface 630 may include a wireless network interface or a wired network interface which is generally used to establish a communication connection between the computing device 2 and other computing devices. For example, the network interface 630 is used for connecting the computing device 2 to an external terminal via a network and establishing a data transmission channel and a communication connection between the computing device 2 and the external terminal. The network can be a wireless or wired network such as an enterprise intranet, an Internet, a Global System of Mobile communication (GSM), a Wideband Code Division Multiple Access (WCDMA), a 4G network, a 5G network, a Bluetooth, Wi-Fi, and the like.

It is to be noted that FIG. 14 shows only a computing device 2 having components 610-630, but it is understood that it is not required to implement all of the shown components and that more or fewer parts can be implemented in lieu thereof.

In the embodiment, a connection control method or a connection control method based on a QUIC protocol stored in the memory 610 may be divided into one or more program modules and executed by one or more processors (processor 620 in the embodiment) to complete the present application.

Embodiment 6

The embodiment provides a computer-readable storage medium, which stores one or more computer programs, the one or more programs can be executed by at least one processor, to cause the at least one processor to embody operation of the connection control method or the connection control method based on a QUIC protocol in the embodiment.

In the embodiment, the computer-readable storage medium includes flash memory, hard disk, multimedia card, card type memory (e.g., SD or DX memory, etc.), random access memory (RAM), static random access memory (SRAM), read-only memory (ROM), electrically erasable programmable read-only memory (EEPROM), programmable read-only memory (PROM), magnetic memory, magnetic disk, optical disk, etc. In some embodiments, the computer-readable storage medium may be an internal storage module of the computing device 2 such as a hard disk or memory of the computing device 2. In other embodiments, the memory 610 may also be an external storage device of the computing device 2, such as a plugged hard disk provided on the computing device, a smart media card (SMC), secure digital (SD) card, a flash memory card, and the like. Of course, the computer-readable storage medium may also include both an internal storage module and an external storage device of the computing device. In the embodiment, the computer-readable storage medium is generally used to store an operating system and various types of application software installed in the computing device 2 such as program codes of the connection control method and the like. In addition, the memory 610 may also be used to temporarily store various types of data that have been or will be outputted.

Apparently, it should be appreciated by those skilled in the art that each module or step described in the embodiment of the present application can be realized by a general-purpose and that the modules or steps may be integrated on a single computing device or distributed on a network consisting of a plurality of computing devices, optionally, the modules or steps may be realized by executable program codes so that the modules or steps can be stored in a storage device to be executed by a computing device, and in some cases, the steps shown or described herein can be executed in a sequence different from this presented herein, or the modules or steps are formed into integrated circuit modules, or several of the modules or steps are formed into integrated circuit modules. Therefore, the present application is not limited to the combination of specific hardware and software.

The embodiments described above are just preferred embodiments of the present application and thus do not limit the patent scope of the present application. Any equivalent structure, or equivalent process transformation made according to the contents of the description and the drawings of the present application or any direct or indirect application to other related arts shall be also included in the patent protection scope of the present application.

What is claimed is:

1. A computer-implemented method of controlling a connection based on a Quick UDP Internet Connections (QUIC) protocol, comprising:
   receiving a QUIC connection request from a peer endpoint;
   analyzing the QUIC connection request and obtaining identification information of the peer endpoint;
   retrieving target historical information of the peer endpoint based on the identification information, wherein the retrieving the target historical information of the peer endpoint based on the identification information comprises retrieving the target historical information from a historical data set based on the identification information, and wherein the target historical information comprises a number of connection terminations of QUIC connections that were not actively terminated by the peer endpoint;
   adjusting a transport parameter based on the target historical information;
   establishing a QUIC connection with the peer endpoint based on the adjusted transport parameter;
   controlling a connection state of the QUIC connection based on the adjusted transport parameter; and
   determining the adjusted transport parameter based on a formula $Y/2^n$, wherein Y represents the transport parameter in the QUIC connection request, n represents the number of the connection terminations.

2. The computer-implemented method of claim 1, further comprising:
   adjusting the transport parameter based on a predetermined threshold value in response to a determination that the target historical information is not retrieved.

3. The computer-implemented method of claim 2, wherein the predetermined threshold value is a system-level parameter value.

4. The computer-implemented method of claim 2, further comprising adjusting the predetermined threshold value based on at least one of:
   system information comprising utilization information of a Central Processing Unit (CPU), utilization information of a memory, and utilization information of a disk interface;
   network flow information;
   a data type of to-be-transmitted data comprising a long-video type and a short-video type; or
   a plurality of video parameters of to-be-transmitted data comprising a resolution, a frame rate, a code rate, and a buffer size of a peer endpoint.

5. The computer-implemented method of claim 1, wherein the transport parameter comprises an idle timeout indicative of a maximum time of allowing the QUIC connection being in an idle state.

6. The computer-implemented method of claim 5, further comprising:
   adjusting the idle timeout to a predetermined threshold value when the idle timeout is absent or is equal to zero;
   adjusting the idle timeout to the predetermined threshold value when the idle timeout is greater than the predetermined threshold value.

7. The computer-implemented method of claim 1, wherein the controlling the connection state of the QUIC connection based on the adjusted transport parameter comprises:
   monitoring an idle time of the QUIC connection being in an idle state;
   comparing whether the idle time exceeds the adjusted transport parameter; and
   switching the connection state of the QUIC connection to a draining connection state when the idle time exceeds the adjusted transport parameter.

8. The computer-implemented method of claim 7, wherein the monitoring the idle time of the QUIC connection being in the idle state comprises:
   recording the idle time of the QUIC connection being in the idle state by a timer; and
   resetting the timer and restarting a timing operation when received data has been processed successfully at an HTTP layer or to-be-transmitted data has been transmitted successfully at a UDP socket.

9. The computer-implemented method of claim 1, further comprising:
   monitoring a termination event of the QUIC connection;
   determining a trigger event type of the termination event, the trigger event type comprising an active trigger event type in relative to the peer endpoint and a passive trigger event type in relative to the peer endpoint;

recording the termination event of the QUIC connection into the historical data set when the trigger event type of the termination event is the passive trigger event type; and clearing the target historical information from the historical data set when the trigger event type of the termination event is the active trigger event type.

10. A system of controlling a connection based on a Quick UDP Internet Connections (QUIC) protocol, comprising:

at least one processor; and at least one memory communicatively coupled to the at least one processor and storing instructions that upon execution by the at least one processor cause the system to:

receive a QUIC connection request from a peer endpoint;

analyse the QUIC connection request and obtaining identification information of the peer endpoint;

retrieve target historical information of the peer endpoint based on the identification information;

adjust a transport parameter based on the target historical information;

establish a QUIC connection with the peer endpoint based on the adjusted transport parameter;

control a connection state of the QUIC connection based on the adjusted transport parameter;

wherein the at least one memory further stores instructions that upon execution by the at least one processor cause the system to:

retrieve the target historical information from a historical data set based on the identification information, wherein the target historical information comprises a number of connection terminations of QUIC connections that were not actively closed by the peer endpoint; and determine the adjusted transport parameter based on a formula $Y/2^n$, wherein Y represents the transport parameter in the QUIC connection request, n represents the number of the connection terminations of QUIC connections that were not actively terminated by the peer endpoint.

11. The system of claim 10, wherein the at least one memory further stores instructions that upon execution by the at least one processor cause the system to:

monitor a termination event of the QUIC connection; and update the historical data set based on the termination event.

12. The system of claim 11, wherein the at least one memory further stores instructions that upon execution by the at least one processor cause the system to:

determine a trigger event type of the termination event, the trigger event type comprising an active trigger event type indicative of a QUIC connection being actively terminated by the peer endpoint and a passive trigger event type indicative of a QUIC connection being not actively terminated by the peer endpoint.

13. The system of claim 12, wherein the at least one memory further stores instructions that upon execution by the at least one processor cause the system to:

record the termination event of the QUIC connection into the historical data set in response to a determination that the trigger event type of the termination event is the passive trigger event type; and clear the target historical information from the historical data set in response to a determination that the trigger event type of the termination event is the active trigger event type.

14. A non-transitory computer-readable storage medium, storing computer programs executed by at least one processor, to cause the at least one processor to implement operations of controlling a connection based on a QUIC protocol, the operations comprising:

receiving a QUIC connection request from a peer endpoint;

analyzing the QUIC connection request and obtaining identification information of the peer endpoint;

retrieving target historical information of the peer endpoint based on the identification information;

adjusting a transport parameter based on the target historical information;

establishing a QUIC connection with the peer endpoint based on the adjusted transport parameter;

controlling a connection state of the QUIC connection based on the adjusted transport parameter;

wherein the operations further comprise:

retrieving the target historical information from a historical data set based on the identification information, wherein the target historical information comprises a number of connection terminations of QUIC connections that were not actively terminated by the peer endpoint; and determining the adjusted transport parameter based on a formula $Y/2^n$, wherein Y represents the transport parameter in the QUIC connection request, n represents the number of the connection terminations of QUIC connections that were not actively terminated by the peer endpoint.

* * * * *